Feb. 18, 1941.  F. M. DARNER  2,232,655
WELDING MACHINE
Filed Oct. 2, 1939   2 Sheets-Sheet 2
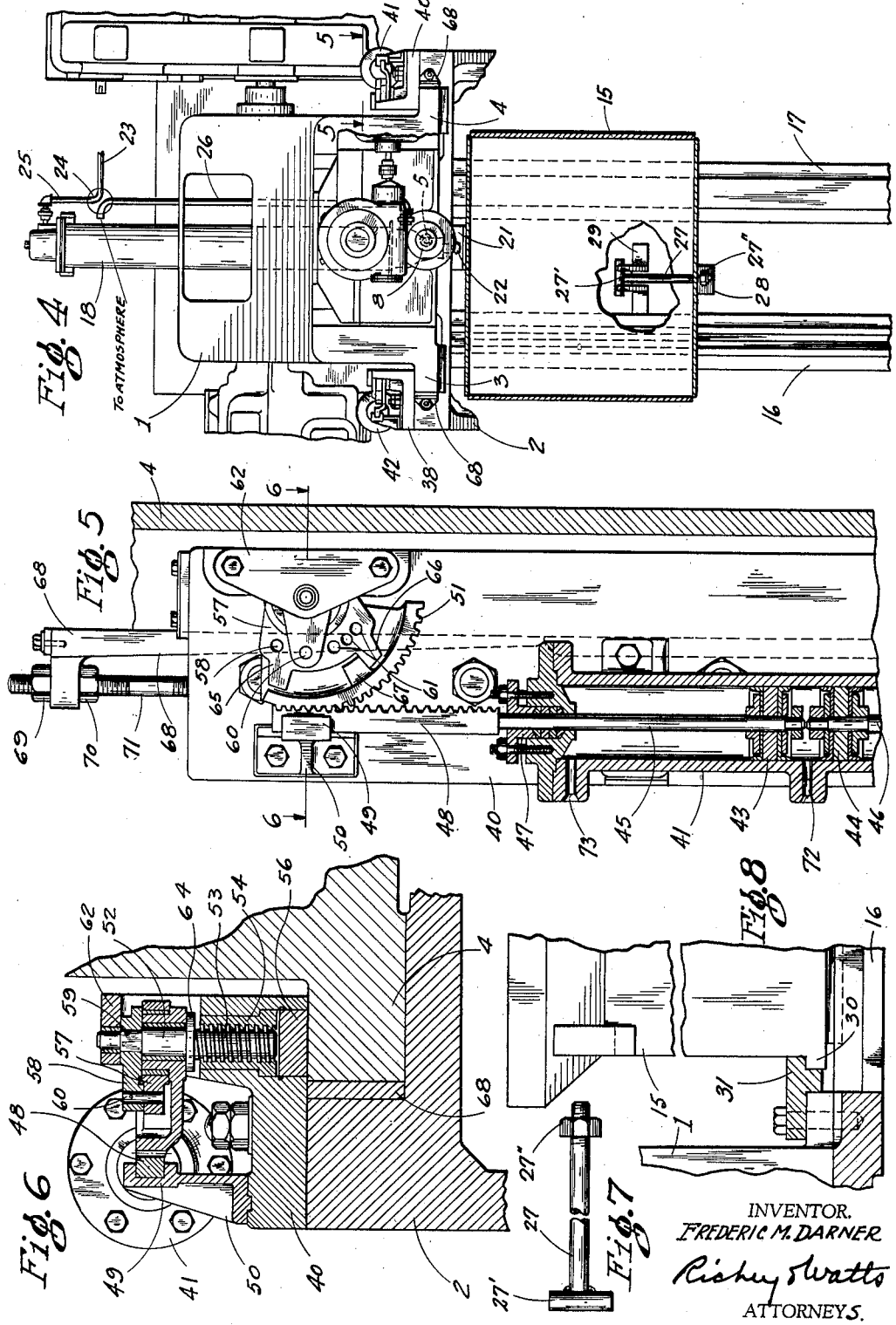
INVENTOR.
FREDERIC M. DARNER
Richey Watts
ATTORNEYS.

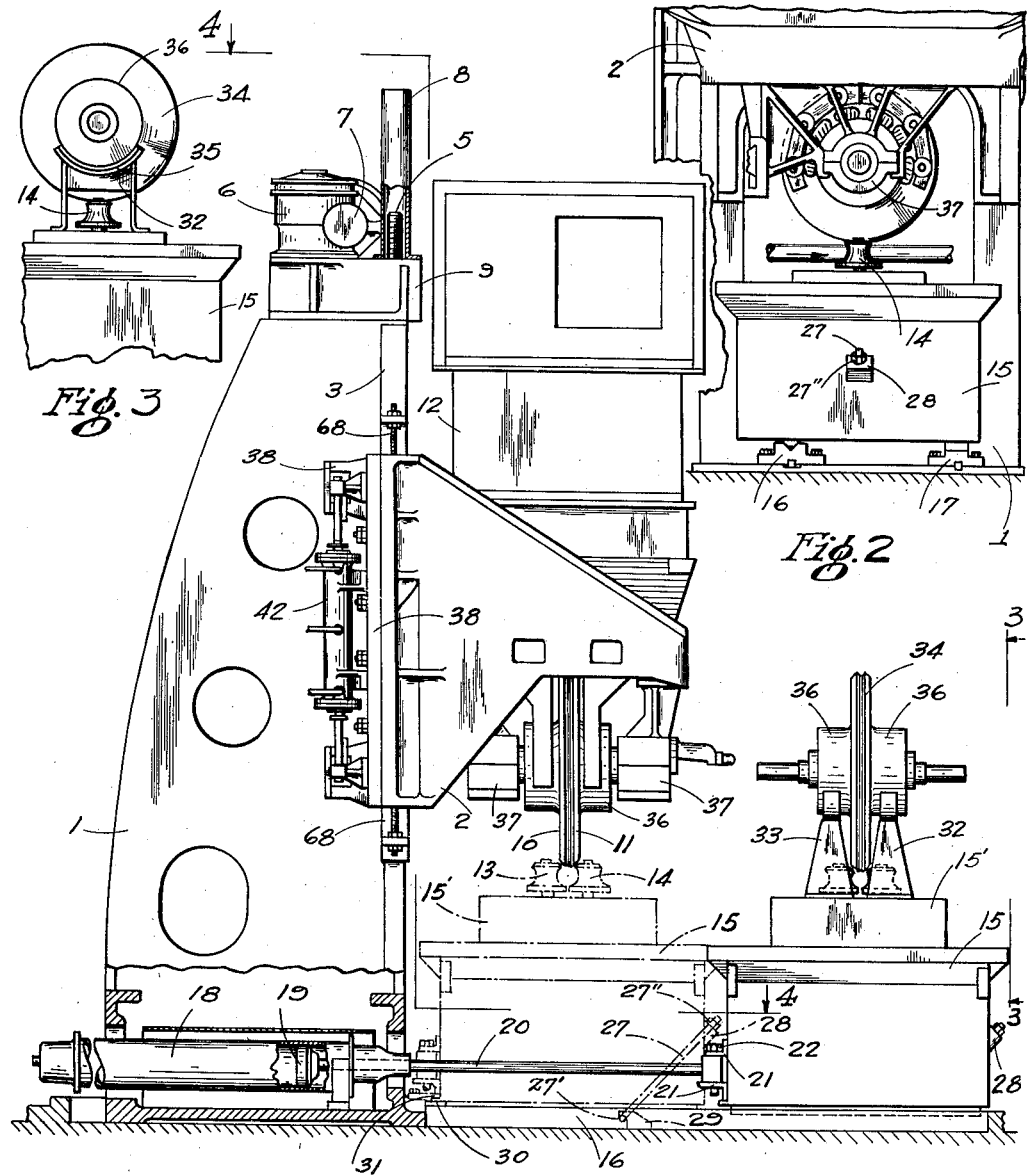

Patented Feb. 18, 1941

2,232,655

UNITED STATES PATENT OFFICE 2,232,655

WELDING MACHINE

Frederic M. Darner, Shaker Heights, Ohio, assignor to Republic Steel Corporation, Cleveland, Ohio, a corporation of New Jersey Application October 2, 1939, Serial No. 297,511

7 Claims. (Cl. 219—6)

This invention relates to welding machines and more particularly to an improved electric tube or pipe welding apparatus.

In the high speed production of electrically-welded tube or pipe, disc electrodes are caused to contact the edges of a moving tube on opposite sides of the seam therein. These electrodes are supported on suitable shafts and, in one very successful form of welding machine, a transformer, which supplies the necessary low voltage, high amperage electrical current to the electrodes, is mounted on the same supporting structure as the electrodes in order that the relatively great weight of the transformer may be utilized to effect proper contact between the electrodes and the tube. Means have been provided for lifting and lowering the entire assembly of electrodes and transformer, together with the brushes or the like which make rotating contact between the transformer terminals and the electrodes, vertically toward and away from the tube. Of course in direct current welding no transformer is needed but the electrode supporting brackets may be vertically movable to adjust the electrode contact.

In previously proposed machines four corner posts have been provided for supporting and guiding the electrode assembly for vertical movement. These posts necessarily are close to the welding throat of the machine and, with such prior machines, changing of the tube supporting rolls which are carried by the base of the machine and changing of the electrodes was a difficult and lengthy job due to the inaccessibility of the parts.

It is among the objects of my invention to provide a tube welding machine in which the tube-supporting rolls and the electrode rolls may quickly and easily be removed from the machine, changed and re-set in working position. Other objects of my invention are the provision of a tube-welding machine in which the welding throat is easily accessible to the operator from practically all sides whereby inspection of the welding operation and adjustment of the parts is greatly facilitated; the provision of a tube-welding machine having a single electrode supporting upright of great rigidity and effective and easily operable means for locking the electrode-supporting bracket in any adjusted position on the upright; the provision of a tube-welding machine in which the entire base assembly may be moved completely free of the other parts of the machine thus greatly facilitating adjustment and changing of the tube-guiding and pressure rolls, seam guide, etc.; the provision of improved means for handling the welding electrodes when they are being removed from or replaced in operating position in the machine; the provision of an electric tube-welding machine having improved accessibility whereby the time of changing the machine over from one size of tubing to another is greatly reduced.

The above and other objects of my invention will appear from the following description of a preferred embodiment thereof, reference being had to the accompanying drawings, in which—

Figure 1 is an end elevation of an embodiment of my improved welding machine, for alternating current welding, looking in the direction of tube travel.

Figure 2 is a fragmentary side elevation of the machine shown in Figure 1, taken from the open side of the machine and showing the electrode and tube-supporting and guiding rolls in working position.

Figure 3 is a fragmentary end view of a removed electrode and the supporting yokes therefor, taken substantially on line 3—3 of Figure 1.

Figure 4 is a plan view taken on line 4—4 of Figure 1, the base being shown in working position.

Figure 5 is an enlarged fragmentary view taken approximately on line 5—5 of Figure 4 and illustrating the upper end of one of the electrode-support-locking mechanisms, the pistons being shown in cross-section for clearer illustration.

Figure 6 is a horizontal cross-sectional view taken on line 6—6 of Figure 5.

Figure 7 is a detached view of the anchor bolt for securing the base of the machine in working position.

Figure 8 is an enlarged vertical cross-sectional view showing the movable base anchoring means.

In the welding machine illustrated the vertical supporting member or upright 1 for the sliding electrode and transformer-carrying bracket 2 is provided with spaced track portions 3 and 4. The cantilever support bracket 2 engages the track or slideways 3 and 4 in a manner which will be more fully described later, and is adapted to be moved vertically upwardly and downwardly by means of the screw 5 and coacting nut (not shown) which is driven from the motor 6 through suitable gearing indicated at 7. A protective cover 8 is positioned over the upper end of the screw 5. The screw has threaded engagement with a rotatably-mounted nut in the upper head 9 of the upright 1 and is secured against axial or rotative movement at its lower end in the overhanging bracket 2. Thus, when the motor 6 is driven, the nut will be rotated and, depending upon the direction of rotation of the motor 6, the screw 5 and bracket 2, together with the disc electrodes 10 and 11 and the transformer 12, will be moved up or down.

Side pressure rolls 13 and 14 for guiding and supporting the tube adjacent the point of contact of the electrodes are mounted on vertical shafts carried on the sliding base 15. The base 15 and the rolls 13 and 14 are shown in operating position in Figure 1 in dot and dash lines and are shown in full lines in their removed position. The bottom of the base 15 slides on the tracks 16 and 17 which are supported on a suitable foundation. The track 16 has a V groove and the runner on the base 15 is correspondingly formed to prevent sidewise displacement of the base relative to the support.

In order to actuate the base 15 and move it into and out of operating position I provide a cylinder 18 having a piston 19 secured to a piston rod 20 which is connected by means of brackets 21 and pin 22 to the side of the base 15. As is best seen in Figure 4, the cylinder 18 is connected to a source of supply of fluid under pressure, such as compressed air, through a pipe 23, control valve 24 and branch pipes 25 and 26. When the valve 24 is turned to connect the source of air under pressure through the pipe 25 to the outer end of the cylinder, the inner or forward end of the cylinder 18 will be connected to the atmosphere through the pipe 26 and the valve and the piston 19 will be moved forward, pushing the base 15 on its slides into the position shown in full lines in Figure 1. When in this position the rolls 13 and 14 may be adjusted or changed, the electrodes may be inspected or removed and changed, by an overhead crane, and the entire floor space beneath the transformer and electrodes is free and accessible if it is desired to work on the electrodes or change or adjust the brushes without removing them from the machine.

When the valve 24 is reversed, air under pressure will be admitted to the forward end of the cylinder 18 and the outer end will be connected to the atmosphere and thus the sliding base 15 will be drawn back into the operating position shown in dot and dash lines in Figure 1.

When in working position the base 15 is locked and held in place by a locking or anchor bolt 27, shown in detached view in Figure 7. This bolt includes a T-head 27' and is provided with a nut 27" at the opposite end. It extends through a boss 28 on the side of the base 15 and the T-head portion 27' engages a bifurcated locking lug 29 on the foundation of the machine. The locking lug or latch 29 has overhanging lips, shown in Figure 1, and the bolt 27 is disposed at an angle so that, when the nut 27" is tightened against the boss 28, the base 15 is held firmly down upon its supporting guides or tracks and is also pushed toward the cylinder 18 so that the flange 30 on the base is disposed under and held down by the overhanging stop members 31 which are secured to the post or upright 1 (see Fig. 8). Thus, when the base 15 is in working position it is anchored down and held rigidly in place by means of the anchor clip stop members 31 and the anchor bolt 27.

When it is desired to move the base into the position shown in full lines in Figure 1, the bolt 27 is loosened, permitting the T-head 27' thereof to drop below the overhanging lip of the latch 29, and then swing upwardly until it disengages the member 29 whereupon the base may be moved freely on its supporting tracks. When the base is returned to working position by the piston 19 the flange 30 will automatically slide into locked position below the anchor clip 31 and the T-head bolt 27 may be tightened to hold the base in position.

In Figures 1 and 3 I have illustrated auxiliary electrode-supporting cradles 32 and 33 which greatly facilitate the removal and replacement of the disc electrodes. In Figure 1 these cradles are shown resting on the roll supporting portion 15' of the base 15 and an electrode 24 is resting upon the cradles. Each cradle has a curved support member 35 which fits the brush contacting hubs or drums 36 of the electrode.

When it is desired to remove an electrode from the machine it is only necessary to place the cradles 32 and 33 upon the roll support 15', lower the bracket 2 until the drums 36 rest upon the portions 35 of the cradles, and then remove the bottom halves 37 of the electrode-bearing housings. The supporting bracket 2 may then be lifted until the brush holders, etc., clear the electrode which is resting upon the cradles 32 and 33, whereupon the cylinder 18 may be actuated to slide the base 15 completely out from under the bracket 2 into the position shown in full lines in Figure 1. To replace the electrode the above described procedure is reversed. Of course, it is not necessary to remove the electrode in order to move the base 15 out of working position, it being only necessary to lift bracket 2 until the electrode clears the rolls 13 and 14, loosen the anchor bolt 27 and unlock it from the latch 29, and then turn the valve 24 to actuate the piston 19.

It is important that the electrodes be held rigidly in adjusted position in order that the pressure of the electrodes upon the tube will remain constant during operation. Any pressure variation will cause variation in the welding current with resulting non-uniformity of the weld and, in order rigidly to lock the bracket 2 in any position to which it may be adjusted by the screw 5, I provide locking mechanism which is shown in Figures 1, 4, 5 and 6.

As noted above, the post or upright 1 is provided with flanges or tracks 3 and 4 which are engaged by the bracket 2 and guide and support it in its vertical movement. As is seen in Figure 4, the bracket 2 is formed to engage two sides of each of the tracks 3 and 4 and has secured to it lock supporting members 38 (see Figs. 1 and 4) and 40 (seen in Figs. 4, 5 and 6) which are secured to the support 2 and complete the engagement of the support with the flanges 3 and 4 of the post or upright 1. The support 2 is provided with mechanism for locking it firmly to each of the tracks 3 and 4 and as the locking mechanism for each track is identical, except that one is right handed and the other left handed, it will suffice for purposes of description to illustrate and explain only one of the electrode and transformer support locking mechanisms. Furthermore, as each single locking mechanism comprises a double ended device and as each end is identical and functions in the same manner, only the upper end of the mechanism for locking the support against the tracks 4 will be illustrated and described in detail.

This locking member includes a cylinder 41, which is similar to and supported in the same manner as cylinder 42 (seen in Fig. 1) on the opposite end of the machine. This cylinder 41 is mounted on the lock support member 40 in the same manner that the cylinder 42 is carried by the gib and lock support 38.

Referring particularly to Figures 5 and 6, pistons 43 and 44 are secured to piston rods 45 and 46 respectively. The upper piston rod 45 extends through a suitable stuffing box 47 in the upper end of the cylinder 41 and carries a rack 48 which moves vertically in a guide 49 formed in a bracket 50 which is secured to the member 40. This rack 48 engages a gear segment 51 which has a bearing on and is adapted to rotate about the threaded clamp shaft 52. A threaded portion 53 of the shaft 52 engages a correspondingly threaded bushing 54 fixed in the member 40. The clamp shoe or pad 56 is disposed in a suitable recess in the member 40 and may be engaged by the end of the screw 53, causing the shoe 56 frictionally to engage the flange 4 on the post 1, thus locking the electrode bracket or support 2 in any adjusted position when the piston 43 is operated by fluid pressure. A clamp-screw-actuating member 57 has a bearing on the hub of the gear segment 51 and the adjustable connecting arm 58 fits the squared portion 59 of the clamp shaft 52. The members 57 and 58 are secured together by a pin 60 which is adapted to be disposed in any one of a series of holes 61 in the member 57. The outer end of shaft 52 has a bearing in a removable plate 62. Shaft 52 has both rotary and axial movement when turned by the movement of the rack 48 and thus is moved into and out of clamping engagement with the pad 56.

Spaced lugs 65 and 66 are formed on the operating arm 57 and are adapted to be engaged by a lug 67 on the gear segment 51. Adjustable tapered gibs 68, which may be moved by changing the position of the nuts 69 and 70 on the screws 71, provide means for obtaining an adjustment between the bracket or support 2, and the tracks 3 and 4 of the post 1.

The operation of the locking mechanisms described is as follows, it being understood that only a small degree of movement need be imparted to the screw 53 to move it from locking position into released position: When the parts are in the position shown in Figures 5 and 6 the locking shoe 56 is released and the support 2 may be moved freely by the screw 5. When the desired adjustment is obtained, fluid under pressure, such as compressed air, is admitted to the cylinder 41 through the port 72. This causes both the pistons 43 and 44 to move toward their respective ends of the cylinder. As the piston 43 moves upwardly the rod 45 and rack 48 also move upwardly and the gear segment 51 will be rotated on its bearing on the shaft 52. The first portion of this movement will merely cause the lug 67 to be moved from the position shown in Figure 5, where it is in engagement with the lug 66 of the member 57, up into engagement with the lug 65. Further movement of the rack 51 will move with it, due to engagement of the lugs 67 and 65, the member 57 and this movement will be transmitted through the pin 60 to the arm 58 which engages the squared portion 59 of the shaft 52 thus turning the threaded shaft 52 in a direction such that the screw 53 will be moved toward the flange 4 engaging the locking shoe 56 which will be pushed up and frictionally locked against the flange 4 of the post 1.

When it is desired to release the lock, fluid under pressure is admitted through the top port 73 (and a corresponding port at the bottom of the cylinder 41 which is not shown) thus moving the piston 43 in downward direction so that the lug 67 engages the lug 66 and causes the screw 53 to turn to release the pressure on the shoe 56.

The purpose of the plurality of spaced holes 61 in the member 57 is to provide means for adjusting the angular relation of the lugs 65 and 66 on the member 57 with the lug 67 on the gear segment 51 so that the lug 67 will always engage the lug 65 in such a manner that the shoe 56 will contact and engage the flange 4. As the thread 53 is of irreversible pitch the locking mechanism will stay locked and will not loosen and permit the position of the electrodes to change except when the operator turns the air into the tube and both ends of the cylinder 41. The space between lugs 65 and 66 allows free movement of lug 67 during its initial movement, particularly in a direction to loosen the lock screw 53. When in locked position the lug 67 is in engagement with the lug 65. The full air pressure will cause a high friction load to be built up resisting movement of the screw in either direction. When the air connections are changed for unlocking, the piston 43 starts toward the center of the cylinder 41 and gains speed during the time that the lug 67 travels from the lug 65 to lug 66. After gaining considerable momentum the lug 67 strikes lug 66 with a hammer blow which assists in breaking the friction set between the pad 56 and end of screw 53. The remainder of the stroke turns the screw 53 to provide the necessary looseness and clearance between pad 56 and the track or guide 4.

The holes 61 provide means for relative adjustment between the screw 53 and its operating members so that wear between the screw 53 and nut 54 can be taken care of and the parts so arranged that tightening and locking of the pad 56 will always occur before the piston 43 contacts the stuffing box end of the cylinder 41.

It will be understood that any suitable valve arrangement (not shown) may be connected to the cylinder 41 to which the fluid pressure connects to permit pressure to be admitted on one side of the pistons 43 and 44 and exhaust from the opposite sides thereof and vice versa.

As explained before, the above description relates only to the upper end of the cylinder 41 but it will be understood that the same description applies to the lower end of the cylinder 41 and the mechanism operated thereby and to the entire assembly of locking mechanism operated by the cylinder 42 which is effective against the flange 3 of the post 1. The central ports which are adapted to discharge fluid pressure between the two opposed pistons of the cylinders 41 and 42 are preferably interconnected and the end ports of the cylinders 41 and 43 are also interconnected by suitable piping (not shown), and a single control valve preferably utilized so that when the valve is moved into one position the central port of both cylinders will be connected to a source of fluid under pressure and both locking mechanisms will grip the supporting flanges on the post 1. These connections are not illustrated but will be readily understood by those skilled in the art. In like manner, when the valve is reversed to open the central port to atmosphere and connect the end ports to a pressure source, all of the friction locking shoes will be simultaneously released and the electrode support may readily be moved up or down by the screw 5.

The preceding description relates to an alternating current welder having a transformer movable with the electrodes. However, the advantageous features of my invention can be utilized in other types of alternating or direct current welders where only the electrodes and their contacting brushes or the like are vertically adjustable.

It will be seen that my welding machine is readily accessible and that the operator can quickly and easily control all of the different adjustments and operations of the machine. The entire structure is simple and has a minimum of operating parts and, although I have described the illustrated embodiment of my invention in considerable detail, it will be understood by those skilled in the art that variations and modifications may be made in the specific form of my welding machine without departing from the spirit of my invention. I do not, therefore, wish to be limited to the particular structural details, etc., shown, but claim as my invention all embodiments thereof coming within the scope of the appended claims.

I claim:

1. In a tube-welding machine of the type described, the combination of means for moving a tube in a path extending in the direction of the tube length, a post mounted on the floor and disposed on one side of the tube path, a bracket supported by said post in overhanging relation to the tube path and adapted to have movement vertically toward and away from the tube path, means for moving said bracket, electrodes carried by said bracket, tracks on the floor and extending from adjacent said post transversely of the tube path, a base slidably supported on said tracks below the tube path and said bracket, tube-guiding means carried by said base, and means for moving said base transversely of the tube path substantially completely out from below said bracket and back into working position below said bracket.

2. In a continuous electric tube-welding machine of the type described, a single supporting post having spaced vertically extending flanges, a cantilever transformer bracket having portions slidably engaging said flanges, friction shoes carried by said bracket and fluid-pressure-actuated means for simultaneously exerting a locking pressure on said shoes and releasing said pressure, and means carried by said post, for lifting or lowering said bracket.

3. In a tube-welding machine, a post, an overhanging electrode bracket mounted thereon for vertical movement, a pair of transversely extending tracks on the floor below said bracket and extending away from the foot of said post, a base carried on said tracks, and means for moving said base into and completely out of working position below said bracket.

4. In a tube-welding machine, a post, an overhanging electrode bracket mounted thereon for vertical movement, a pair of transversely extending tracks on the floor below said bracket extending away from the foot of said post, a base carried on said tracks, fluid-pressure-actuated means for moving said base into and completely out of working position below said bracket, and means for rigidly securing and holding said base in working position.

5. In a welding machine of the type described, the combination of an electrode, means for rotatably supporting said electrode, said electrode having brush-engaging hubs, a base, means for moving said base into and completely out of working position below said electrode, and a pair of electrode supports having saddle portions and adapted to be removably positioned on said base with said saddle portions below said brush engaging hubs whereby said electrode may be carried by said supports and removed from working position when said base is moved completely out of its working position.

6. In a welding machine of the type described, a supporting post, an electrode-supporting bracket slidably mounted on said post, means for moving said bracket vertically on said post, an electrode supported by said bracket, a movable base disposed below said bracket and electrode, means for moving said base into and completely out of working position below said bracket, and an electrode support removably positioned on said base and adapted to support said electrode on said base when said base is moved into or out of working position.

7. In a tube-welding machine of the type described, the combination of means for moving a tube in a path extending in the direction of the tube length, a post disposed on one side of the tube path, an overhanging electrode bracket mounted on said post for vertical movement, a base positioned below said bracket, tube-guiding means carried by said base, means for supporting said base for movement transversely of the tube path, and means for moving said base on said supporting means substantially completely out of working position below said bracket.

FREDERIC M. DARNER.